United States Patent [19]

Burkhardt, Jr. et al.

[11] 4,183,055
[45] Jan. 8, 1980

[54] BEAM/SEAM ALIGNMENT CONTROL FOR ELECTRON BEAM WELDING

[75] Inventors: James H. Burkhardt, Jr., Knoxville; J. James Henry, Oak Ridge; Clyde M. Davenport, Knoxville, all of Tenn.

[73] Assignee: The United States of America as represented by the United States Department of Energy, Washington, D.C.

[21] Appl. No.: 936,458

[22] Filed: Aug. 24, 1978

[51] Int. Cl.² .................................................. H06N 7/18
[52] U.S. Cl. ...................................... 358/101; 358/93
[58] Field of Search .................................. 358/93, 101

[56] References Cited

U.S. PATENT DOCUMENTS

| | | | |
|---|---|---|---|
| 3,301,949 | 1/1967 | Ullery | 358/101 |
| 3,532,807 | 10/1970 | Webb | 358/101 |
| 4,001,497 | 1/1977 | Bosworth | 358/101 |
| 4,021,840 | 3/1977 | Ellsworth | 358/101 |
| 4,062,046 | 12/1977 | Pratt | 358/101 |

Primary Examiner—Howard W. Britton
Attorney, Agent, or Firm—R. V. Lupo; Stephen D. Hamel; Louis M. Deckleman

[57] ABSTRACT

This invention relates to a dynamic beam/seam alignment control system for electron beam welds utilizing video apparatus. The system includes automatic control of workpiece illumination, near infrared illumination of the workpiece to limit the range of illumination and camera sensitivity adjustment, curve fitting of seam position data to obtain an accurate measure of beam/seam alignment, and automatic beam detection and calculation of the threshold beam level from the peak beam level of the preceding video line to locate the beam or seam edges.

4 Claims, 3 Drawing Figures

BEAM/SEAM ALIGNMENT CONTROL FOR ELECTRON BEAM WELDING

BACKGROUND OF THE INVENTION

This invention was made in the course of, or under, a contract with the U.S. Department of Energy.

The Lawrence Radiation Laboratory has developed a system that uses a television camera to view the area on a workpiece in the immediate vicinity of the beam as described in their report LER 70-105002, entitled "A Closed Circuit Television Electron-Beam Weld Tracking System." In that system, the camera output is fed into an interpreter circuit to determine whether the beam is to the "left", to the "right", or over the center of the seam. Basic operation of the interpreter is as follows: Video output from the TV camera is fed to a two-level amplifier which transforms the original video signal into either all-black or all-white information. Two preselected horizontal lines of this video signal are then scanned. The first scan is used to determine the center of the weld beam, and the second is used to determine the center of the seam. This information is then available for use with a strip-chart recorder or control computer.

The results obtained from the above system as developed by the Lawrence Radiation Laboratory are somewhat less than satisfactory basically due to the difficulty that has been incurred in obtaining a clean video signal from the seam of a workpiece. Evaluation of preselected lines can result in loss of beam information if the beam is vertically deflected. Inaccuracies in monitoring have also been due to variations or drift in the slope of the seam with respect to horizontal distances between the points at which the beam and seam are monitored. Therefore, a need exists to provide a means for obtaining more accurate video signals from the workpiece. The present invention was conceived to meet this need in a manner as described hereinbelow.

SUMMARY OF THE INVENTION

It is the object of the present invention to rovide an accurate and improved dynamic beam/seam alignment control system and method for electron beam welds using video apparatus.

The above object has been accomplished in the present invention by providing an accurate dynamic beam/seam alignment control system for electron-beam welds using video apparatus wherein the improvements in the system include automatic control of the workpiece illumination, near infrared illumination of the workpiece to limit the range of illumination and camera sensitivity adjustment, curve fitting of seam position data to obtain an accurate measure of beam/seam alignment, and automatic beam detection and calculation of the threshold beam level from the peak beam level of the preceding line to locate the beam edges. In addition a technique for seam position storage is also provided.

DESCRIPTION OF THE PREFERRED EMBODIMENT

Figure 1:
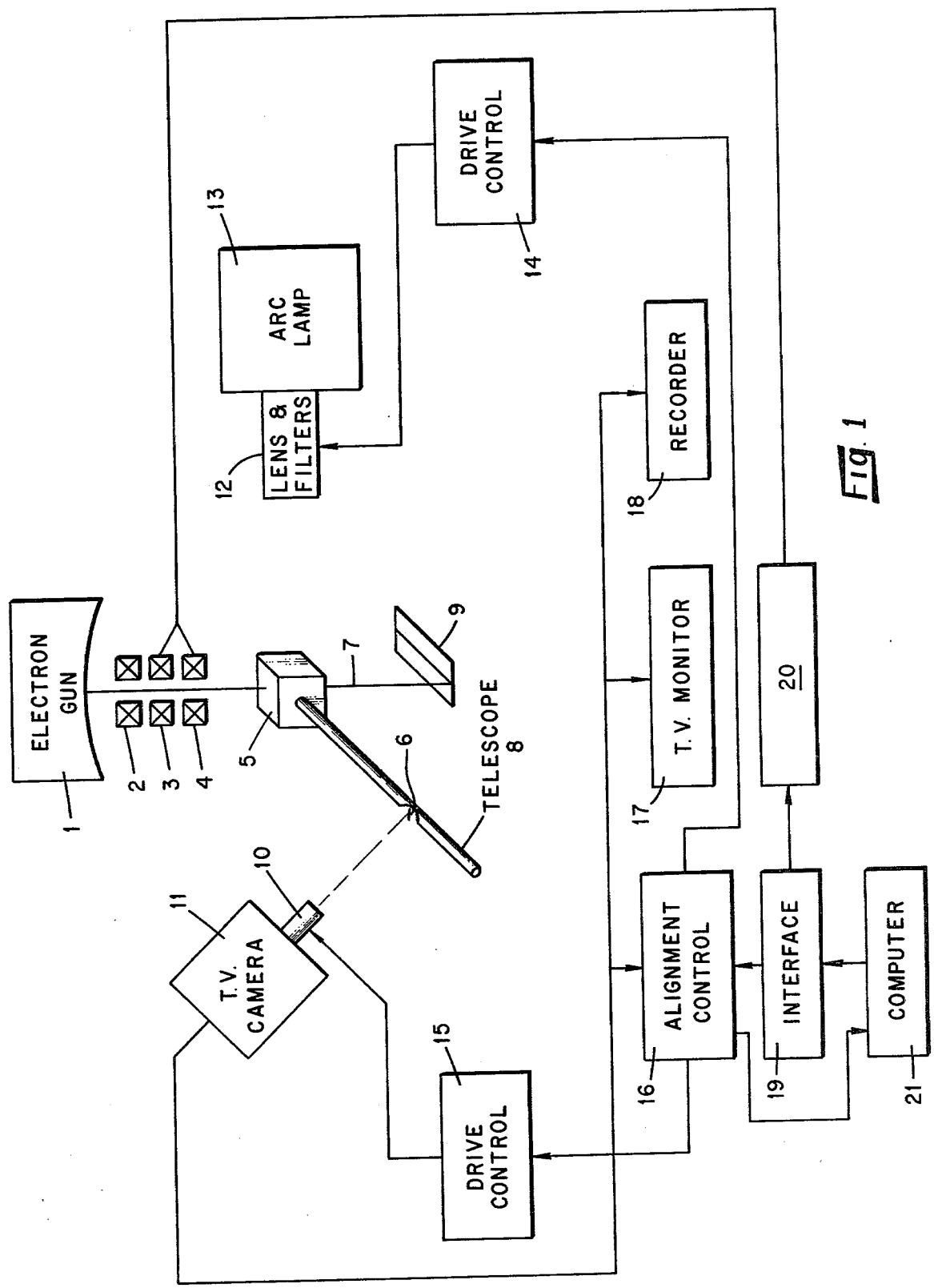
FIG. 1 is a block diagram illustrating the beam/seam alignment system of the present invention.

A block diagram of the seam/beam alignment system of the present invention is illustrated in FIG. 1 of the drawings. Referring to this figure, an electron beam 7 is generated by an electron gun 1 and focused as desired by a focus coil 2. Two sets of X-Y deflection coils 3,4 are used to position the electron beam 7 at the desired position and to maintain the beam 7 perpendicular to the workpiece 9. A mirror assembly 5 directs light from a xenon arc lamp 13 to a weld region of the workpiece 9 and from the weld region of the workpiece 9 to a telescope 8. A spectrally selective mirror 6 directs an infrared portion of the light from the weld region toward motorized filters 10 and a television camera 11 and allows the visible portion of light to travel out the telescope 8 to the operator.

The xenon lamp 13 is a 1-kw lamp which provides a bright light with strong spectral lines at 8280 nanometers and 9920 nanometers. The output from the strong spectral lines is particularly useful in this situation because they are in the rnge at which a video camera with a silicon target vidicon is sensitive. Ether spectral line has sufficient intensity to provide adequate illumination of weld zones having temperatures up to 3000° C. Light intensity is controlled with a motorized neutral density filter 12.

A lens 10 provides the proper field of view. A motorized neutral density filter in the lens 10 is used to adjust the light intensity to a silicon target vidicon television camera 11. The lens 10 also contains a narrow band interference filter centered at either the 8280-nanometer or the 9920-nanometer spectral line of the xenon arc lamp 13. Utilizing narrow band infrared filtering reduces the dynamic range of intensity control required for the camera 11 and the xenon arc lamp 13 to less than 20,000:1 for weld zone temperatures ranging from 1100° C. to 3000° C.

Figure 2:
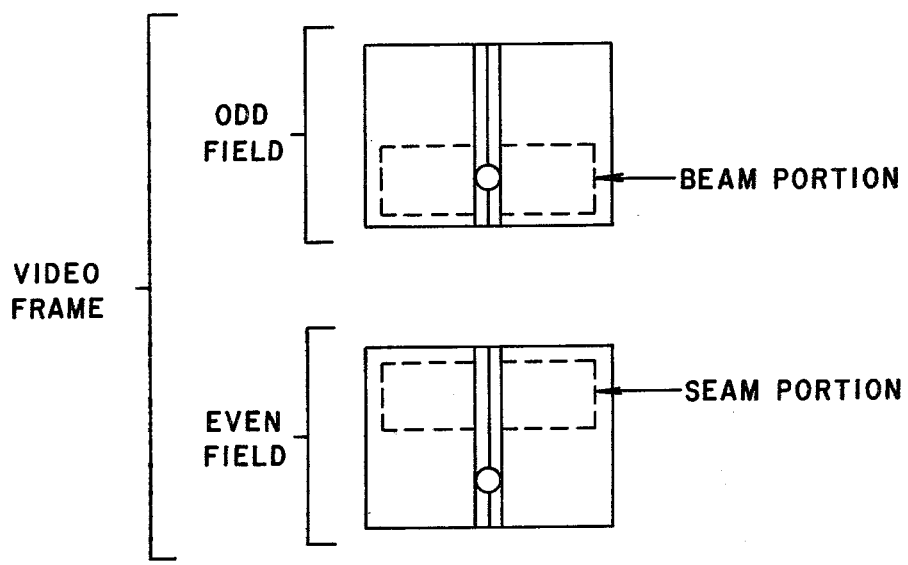
FIG. 2 is a schematic illustrating a typical video frame depicting the location of the beam portion of an odd field and the seam portion of an even field.

Beam/seam alignment electronics 16 monitor the video output of the television camera 11. The output of camera 11 is also coupled to a television monitor 17 and to a video tape recorder 18. Standard interlaced video is used having an odd and even field for each frame (see FIG. 2). The beam/seam alignment electronics 16 analyze the latter portion of the odd field for beam data and the first portion of the even field for seam data. The peak video signal in each portion is defined as the peak beam level and peak illumination level, respectively. These data are read by a computer 21 which is coupled to the control unit 16 by means of a computer interface 19, and calculations are made to generate data for control of the respective filters 10 and 12 by means of the respective drive control units 15 and 14 to obtain the peak beam level and peak illumination level which are necessary for proper picture contrast and usable video signal. The computer 21 may be a Digital Equipment Corporation Model PDP-11/45 unit, for example.

Figure 3:
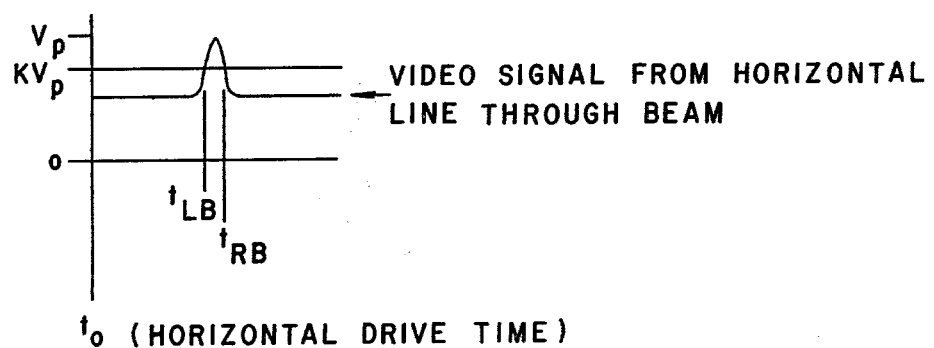
FIG. 3 is a beam data acquisition diagram.

When the video signal exceeds the average video level by a predetermined amount in the beam portion of the odd field, the beam has been detected. The horizontal position of the left edge and right edge of the beam are determined for three different vertical positions (horizontal traces) in the beam. The horizontal positions are determined by counting up separate counters for left and right positions with a clock started with e--h horizontal drive pulse to the camera, and counting until a predetermined video threshold ($KV_p$ in .'IG. 3) is crossed in the positive direction for left position, $t_{LB}$ in FIG. 3, and then crossed in the negative direction for right position, $t_{RB}$ in FIG. 3. The threshold level is determined by reading the peak video level $V_p$ in the horizontal line preceding the line of interest and using a percentage of this peak value $KV_p$ as the threshold voltage for comparison with the video signal in the line of interest. Vertical position is determined by counting horizontal drive pulses to the camera following the start of each odd field. At the end of each frame then, the peak beam value is stored in a register; the peak illumination value is stored in a register; and the vertical position, left data position, and right data position for three beam data horizontal lines are stored in a scratch pad memory in the unit 16. Now an interrupt signal is generated to the computer to signal that data are ready. The computer software reads the data into memory, makes calculations for light intensity and camera sensitivity adjustments as previously discussed, and determines if remaining data are usable. If data are determined to be usable, then the three pieces of left data and right data for the beam are used to estimate the center of the beam horizontally.

To locate the seam position prior to welding, the computer positions with workpiece to the desired angular position, and the operator positions a marker on the television monitor on top of the seam and presses a button so that the computer stores the marker position as the seam position for that workpiece position. This procedure is repeated enough times to accurately describe the workpiece seam position as a function of workpiece angular position. Then during welding, the measured beam position is compared with the stored seam position, and the beam position is corrected as required with the computer sending an adjustment command signal to a programmable current source 20 via the interface 19. The source 20 in turn drives the horizontal deflection coils 3,4.

It should be noted that in the operation of the above system without seam tracking, the electron beam was deflected about 7.5 millimeters away from a true line, but with the seam tracking of the present invention, a true line was maintained within the desired ±0.05 millimeter at welding surface speeds up to 7.6 m/min. For other details of the welding system in which the present invention can be utilized, reference is made to the Union Carbide Report Y-2114, dated May 10, 1978.

In addition to being utilized to maintain beam/seam alignment, the video system of the present invention can be used to determine lateral runout of the seam for preweld inspection of fixturing adjustment. Also, manual storage of seam position may be used to designate a desired weld position for rework of a previously welded workpiece or to maintain weldment in a desired location on any welding process.

A comparison of the above-described invention to the prior art as described in the above-mentioned report reveals the following points of interest:

a. The present invention provides for automatic control of workpiece illumination and camera sensitivity. The reported research cited above does not.

b. Narrow band, near infrared illumination of the workpiece is used to limit the dynamic range of illumination and camera sensitivity adjustment in the present invention. The reported research cited above does not.

c. The present invention provides for preweld storage of seam position. The reported research cited above does not.

d. The peak video level is determined for each horizontal line so that when a line occurs when data must be taken, a percentage of the peak video level from the preceding line can be used as a threshold level to locate the beam edges. The reported research cited above uses fixed threshold levels.

e. Computerization of the present invention allows it to be used to measure lateral runout of the seam for preweld inspection of fixturing alignment. The reported research cited above does not provide for this capability.

This invention has been described by way of illustration rather than by limitation and it should be apparent that it is equally applicable in fields other than those described. For example, the present invention could be used to monitor the location, or movement, of any interior energy source on a surface such as the tracking of the movement of a laser beam reflected a polished surface.

What is claimed is:

1. In an electron beam welder provided with an electron gun for directing an electron beam therefrom onto a workpiece, a focus coil for focusing said beam, and a double set of X-Y deflection coils for controlling the position of said beam with respect to a seam on said workpiece to be welded, an improved beam/seam alignment control system for said welder comprising a mirror assembly; a high intensity arc lamp; a first condenser lens and motorized neutral density filter assembly coupled to said arc lamp for directing illumination onto said workpiece by means of said mirror assembly; a telescope coupled to said mirror assembly for receiving light reflected from said workpiece, said telescope provided with a spectrally selective mirror; a silicon vidicon television camera; a second condenser lens and motorized neutral density filter assembly coupled to said camera for receiving an infrared portion of said reflected light from said workpiece by way of said spectrally selective mirror, said mirror allowing the visible portion of said light to travel out said telescope to an operator, said second filter assembly also containing a narrow band interference filter; a beam/seam alignment electronic control unit coupled to the output of said camera; a television monitor and a video tape recorder also respectively coupled to the output of said camera; a digital computer coupled to said control unit; a computer interface coupled between said control unit and said computer; a first drive control unit coupled between said electronic control unit and said first filter assembly; a second drive control unit coupled between said electronic control unit and said second filter assembly; and a programmable current source coupled between said computer interface and said X-Y deflection coils, whereby prior to a welding operation the position of said workpiece seam is stored in said computer as a function of a set marker position on said television monitor for a desired workpiece angular position, and during a subsequent operation of said welder, said electronic control unit acting in conjunction with said computer monitors the video output of said camera to first automatically generate data for controlling each of said respective drive control units for respective control of each of said filter assemblies to thus automatically maintain a peak beam level and a peak illumination level, and second when the beam has been detected the horizontal position of the left edge and right edge of the beam are determined for three different vertical positions (horizontal traces) in the beam for a predetermined video threshold level, said computer utilizing the three pieces of left data and right data for said beam to estimate the center of said beam horizontally, and finally said computer comparing the measured beam position with said stored seam position and providing any necessary control signal to said programmable current source which in turn drives said X-Y deflection coils to thus maintain said electron beam in alignment with said seam being welded.

2. The control system set forth in claim 1, wherein said arc lamp is a xenon arc lamp.

3. The control system set forth in claim 2, wherein said narrow band interference filter of said filter assembly is centered at either the 8280-nanometer or the 9920-nanometer spectral line of said xenon arc lamp.

4. The control system set forth in claim 3, wherein said predetermined video threshold level is determined by said computer by determining the peak video level in the horizontal line preceding the line of interest and using a percentage of said peak as the threshold voltage for comparison with the video signal in the line of interest.

* * * * *